(12) United States Patent
Katz et al.

(10) Patent No.: US 7,404,527 B2
(45) Date of Patent: Jul. 29, 2008

(54) SAFETY SHIELD FOR AN ICE SHAVING MACHINE

(75) Inventors: Jonathan M. Katz, Solon, OH (US); Richard D. Boozer, Wakeman, OH (US); Stephen P. Rukavina, Bedford Heights, OH (US); Jim Lachendro, Fairview Park, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 420 days.

(21) Appl. No.: 10/851,807

(22) Filed: May 21, 2004

(65) Prior Publication Data

US 2005/0258286 A1   Nov. 24, 2005

(51) Int. Cl.
*A01F 21/00* (2006.01)
*B02C 23/00* (2006.01)
*B23Q 11/00* (2006.01)

(52) U.S. Cl. .................................. 241/37.5; 241/101.2
(58) Field of Classification Search ................ 241/37.5, 241/101.2, DIG. 17
See application file for complete search history.

(56) References Cited

U.S. PATENT DOCUMENTS

| | | | | |
|---|---|---|---|---|
| 4,589,599 A | * | 5/1986 | Williams | 241/37.5 |
| 4,962,895 A | * | 10/1990 | Gallaher | 241/101.2 |
| 6,793,167 B2 | * | 9/2004 | Karkos et al. | 241/101.2 |
| 6,854,675 B2 | * | 2/2005 | Wong | 241/92 |
| 2004/0042338 A1 | | 3/2004 | Wu | 366/205 |

FOREIGN PATENT DOCUMENTS

DE   102 44 599 A1   4/2004

* cited by examiner

*Primary Examiner*—Bena Miller
(74) *Attorney, Agent, or Firm*—Renner, Kenner, Greive, Bobak, Taylor & Weber

(57) ABSTRACT

A safety shield (10) is adapted to be used in a machine having a blade assembly such as an ice shaving and dispensing machine (11). The machine (11) has an ice bin (13) carried by a pedestal (12). An ice shelf (31) has an opening (32) and is positioned in the bin (13). The opening (32) provides access to the blade assembly which includes a shaver wheel (35) which directs ice to a blade (40). The shield (10) has a ring-shaped sidewall (50) which is carried by the bin (13) and which can extend upwardly out of the bin (13) to increase the capacity thereof. The shield (10) also includes a disk-shaped hub (51) which is connected to the sidewall (50) by a plurality of arms (52). The hub (51) is larger than the opening (32) and is positioned over the opening (32) to prevent direct human access thereto. But ice may still pass through openings (53) between the arms (52) and through the opening (32) in the shelf (31) to be received by the blade assembly.

11 Claims, 5 Drawing Sheets

SAFETY SHIELD FOR AN ICE SHAVING MACHINE

TECHNICAL FIELD

This invention relates to a device which prevents the user from contacting the blade components of a machine such as an ice shaving machine. More particularly, this invention relates to a device which allows user access to the bin of an ice shaving machine while at the same time preventing the user from making contact with the blade components thereof.

BACKGROUND ART

Machines which utilize blades to grind or otherwise cut food items such as ice or the like are most often required to provide safety features to prevent injury to the user. Typical of such machines is an ice shaving and dispensing machine such as shown in U.S. Pat. No. 6,194,013. In these devices, the blade components are positioned at the bottom of a bin which is adapted to receive a supply of ice which is to be shaved and which has a cover.

Because the blade and other blade components could do serious damage to the hands of the user of the machine, most safety regulations currently require that the blade assembly be inoperable if the cover is removed from the bin. To that end, the unit is typically provided with a safety switch which disconnects the power to the blade assembly when the cover is removed. However, such switches have not totally been reliable and otherwise present problems for the unit. For example, if the switch is otherwise able to survive the hostile environment encountered in an ice shaving bin, it is nevertheless susceptible to falsely shutting off the power from the blade assembly. Such might occur, for example, when a bin full of ice being shaved would exert an upward force on the cover as the ice forms bridges and the like in the bin. This upward force could cause the cover to be sufficiently displaced such that the switch turns off the blade assembly at a time when it should be operating.

In addition, there are other detriments to the current safety switch devices. Oftentimes, the owner of a machine such as shown in U.S. Pat. No. 6,194,013 sees a need to increase the capacity of his ice bin. Rather than buying an entirely new unit, the user could position a capacity extending skirt on the open top of the bin and then place the cover on that skirt. However, such would permanently open the safety switch, rendering the blade assembly inoperable, and thus, if the owner wants addition capacity, he must either purchase a new unit or somehow reposition the safety switch to account for the new height of the bin.

DISCLOSURE OF THE INVENTION

It is thus an object of the present invention to provide a device for a unit having a blade assembly which prevents the user of the unit from making bodily contact with an operating blade assembly.

It is another object of the present invention to provide a device, as above, which is effective to prevent bodily injury even when the cover is off the unit.

It is a further object of the present invention to provide a device, as above, which allows the user to add capacity to the unit.

It is an additional object of the present invention to provide a device, as above, which itself can add capacity to the unit.

These and other objects of the present invention, as well as the advantages thereof over existing prior art forms, which will become apparent from the description to follow, are accomplished by the improvements hereinafter described and claimed.

In general, an apparatus made in accordance with the present invention includes a blade assembly and an opening to the blade assembly through which access may be had to the blade assembly. A shield is spaced from the opening and denies direct access to the opening.

The shield, which is adapted to be positioned so as to deny human access through an opening to a blade assembly and yet provide access to the blade assembly of items to be processed by the blade assembly, includes a hub and a ring. A plurality of arms extend between the hub and the ring. The hub is adapted to be positioned spaced from and over the opening.

In accordance with another aspect of the invention, the shield is adapted to be used with an ice shaving device which includes a bin to receive a supply of ice. A blade assembly is positioned near the bottom of the bin and there is an access opening to the blade assembly. The shield is positioned in the bin so as to deny direct human access to the access opening and yet allow the ice to pass through the access opening.

A safety device for a unit having a blade assembly incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A safety shield device made in accordance with the present invention is indicated generally by the numeral 10 and is shown as being used with an ice shaving and dispensing machine generally indicated by the numeral 11. Ice shaver 11 can be of the type shown in U.S. Pat. No. 6,194,013 to which reference is made, as necessary, for a complete understanding of one environment in which safety shield 10 may be used.

Figure 1:
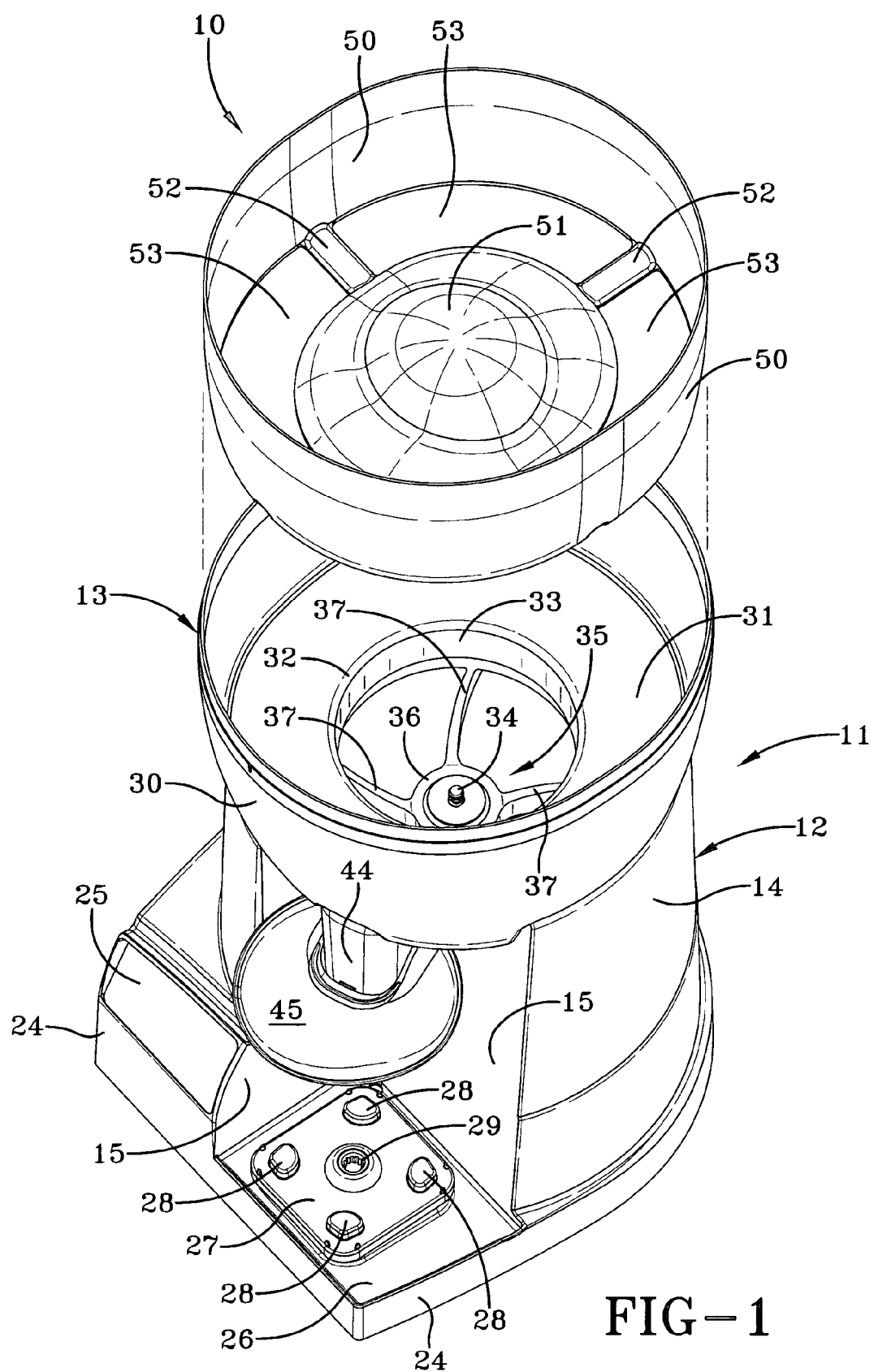
FIG. 1 is an exploded perspective view showing a shield device made in accordance with the concepts of the present invention as it would be used with an ice shaving machine.
Figure 2:
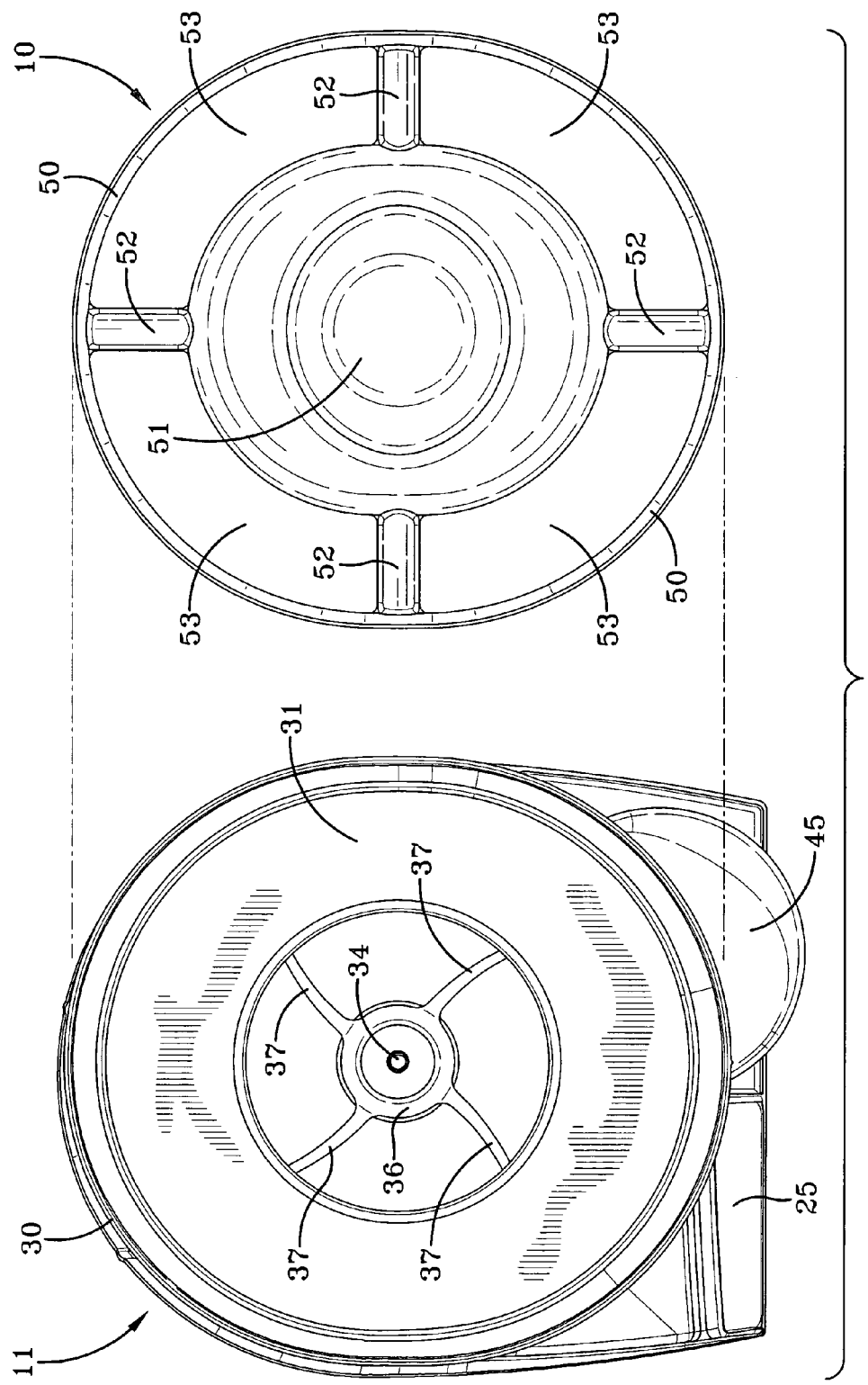
FIG. 2 is an exploded top plan view of the components shown in FIG. 1.
Figure 3:
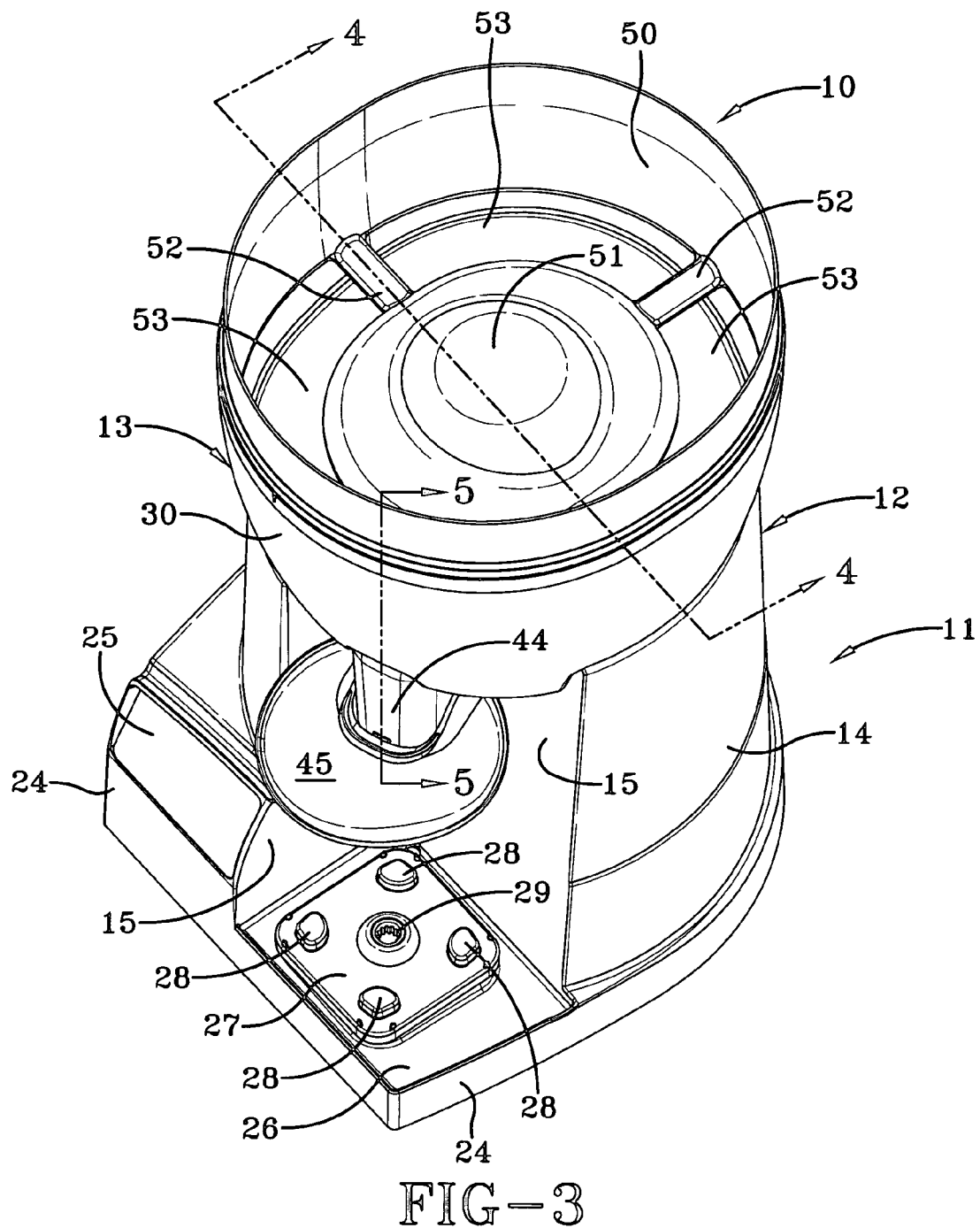
FIG. 3 is a perspective view showing the components of FIG. 1 assembled.
Figure 4:
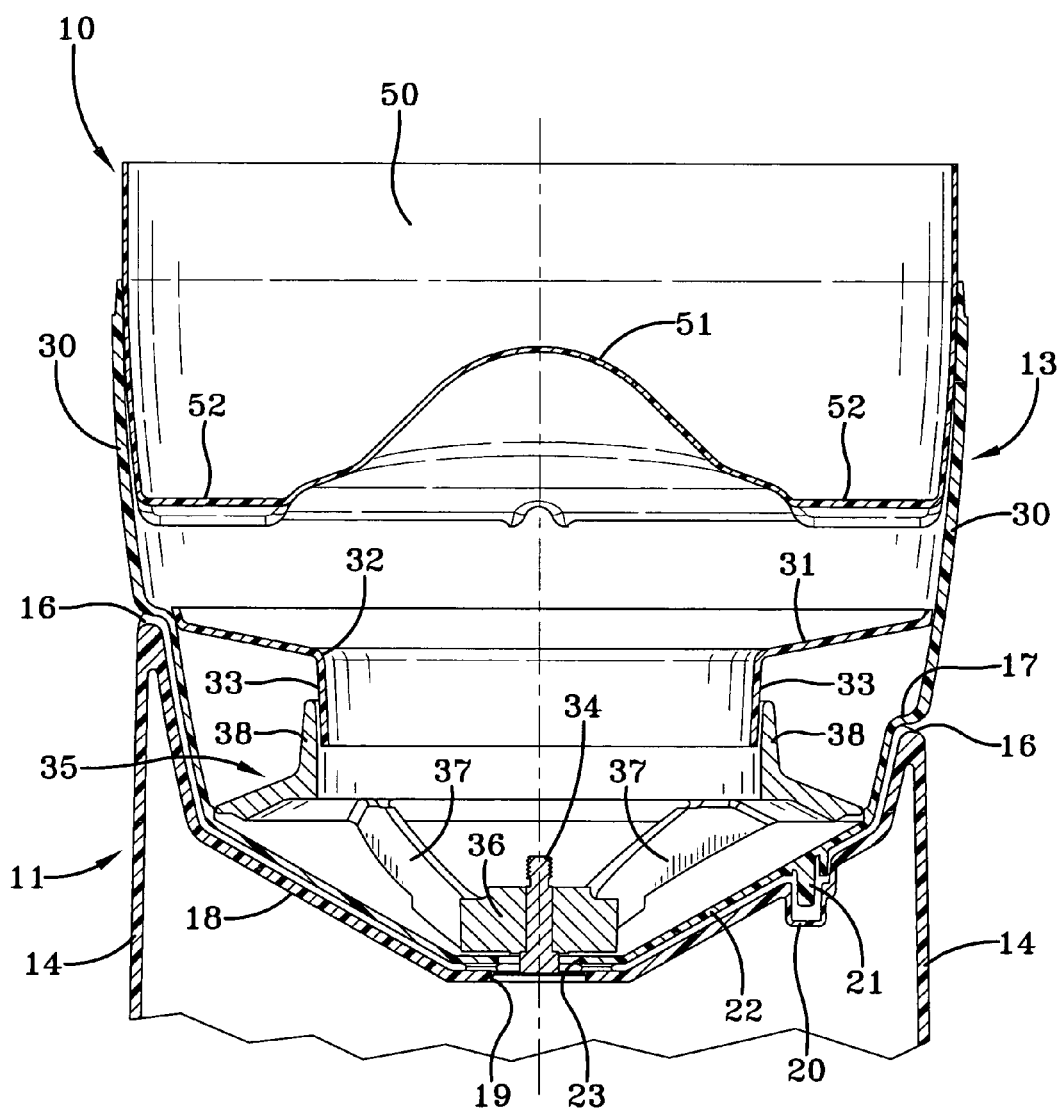
FIG. 4 is a sectional view taken substantially along line 4-4 of FIG. 3.
Figure 5:
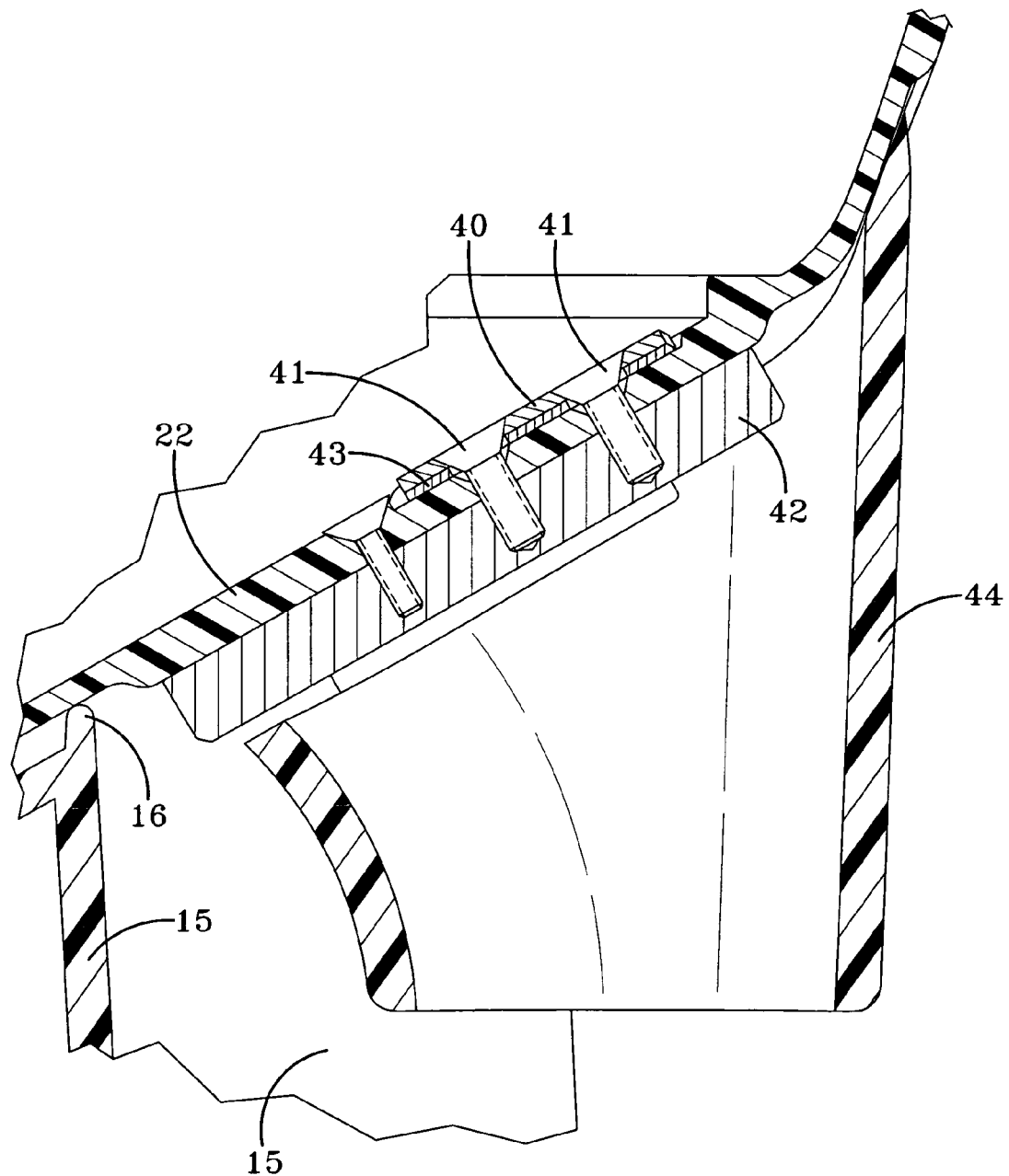
FIG. 5 is a fragmented sectional view taken substantially along line 5-5 of FIG. 3.

Briefly describing some of the basic components of ice shaver 11, its function is to provide a predetermined amount of ice to a container, such as the pitcher of a blender. Ice shaver 11 includes a main housing or pedestal generally indicated by the numeral 12, and an ice bin generally indicated by the numeral 13. Pedestal 12 includes a generally upstanding cylindrical sidewall 14 interrupted by upstanding container walls 15. As shown in FIGS. 4 and 5, sidewall 14 and walls 15 have an upper rim 16 upon which a ledge 17 formed in bin 13 rests. Pedestal 12 also includes a dish-shaped top wall 18 having an opening 19 therein. Top wall 18 also includes at least one slot 20 which receives a locating pin 21 formed in the bottom surface 22 of bin 13. Bottom surface 22 of bin 13 is also provided with an aperture 23 which is aligned with opening 19 in top wall 18 of pedestal 12, for purposes which will hereinafter be discussed.

Pedestal 12 also includes a base portion 24 which can include a control panel 25 and a container shelf 26. Shelf 26 may be provided with a conventional blender mounting plate 27 which receives the pitcher of a blender (not shown) which is properly located by pads 28 and connected to a shaft 29 driven by a motor (not shown).

Ice bin 13 includes an upstanding, generally cylindrical sidewall 30 extending upwardly from ledge 17. An ice shelf 31 having a central opening 32 formed by a cylindrical flange 33 is positioned in ice bin 13 near the bottom of sidewall 30, that is, slightly above ledge 17 and spaced from bottom surface 22 of bin 13. A motor driven shaft 34 extends upwardly through the aligned opening 19 in top wall 18 of pedestal 12 and the aperture 23 in bottom surface 22 of bin 13. Shaft 34 carries a shaver wheel, generally indicated by the numeral 35, which is part of a blade assembly now to be described.

Shaver wheel 35 is preferably made of a cast aluminum material and includes a hub 36 which is attached to shaft 34. Hub 36 carries a plurality of paddles 37 which are generally arcuate and which extend generally radially outward from hub 36. A shaver ring 38 is formed near the ends of paddles 39, and it generally surrounds flange 33 of ice shelf 31.

When a supply of ice is provided to fill bin 13, some of the ice will, of course, drop through the central opening 32 of ice shelf 31 to the bottom surface 22 of bin 18. A supply of ice is thus confined by bin 13 within the sidewall 30 and bottom surface 22 thereof. The ice at the bottom of bin 13 will thus generally surround shaver wheel 35 and, because ice shelf 31 is sloped toward opening 32, ice in the upper part of bin 13 will be continually directed to the area of shaver wheel 35.

Upon the activation of an ice shaver motor (not shown) shaft 34 will rotate shaver wheel 35 typically at a speed of two hundred revolutions per minute or higher. Such action directs ice, by centrifugal force, generally radially outwardly toward a blade 40 of the blade assembly. As shown in FIG. 5, blade 40 is carried by bottom surface 22 of bin 13 just below the periphery of shaver wheel 35. To that end, machine screws 41 pass though bin bottom surface 22 and are threaded into a plate 42. A shim 43 between blade 40 and bin bottom surface 22 is provided to properly position blade 40 at a desired height above surface 22. As the ice is forced between the bottom surface of paddles 37 and against blade 40, it is shaved and may pass through an ice chute 44 carried by plate 42. Chute 44 thus directs the shaved ice to a container (not shown) positioned on blender mounting plate 27. A container cover 45 may be carried by ice chute 44 to prevent splashing of any contents of the container as the ice is received therein.

Normally, ice bin 13 is provided with a cover, but as shown in the drawings, when the cover is off, the blade assembly, and in particular shaver wheel 35 thereof, is exposed through opening 32 in ice shelf 31. As such, with the shaver motor not running, a person could put his hand through opening 32 and make contact with blade 40. Or, with the shaver motor running, the shaver wheel 35 component of the blade assembly could be accidentally contacted by the user. Thus, as previously described, some type of safety device must be provided as a means to prevent access to any component of the blade assembly. The safety shield device 10 of the present invention accomplishes that result.

Safety shield 10 is preferably ring-shaped having a generally cylindrical sidewall 50 of a size adapted to be received within sidewall 30 of bin 13. Sidewall 50 can be attached to sidewall 30 in any conventional method, such as by screws (not shown). Moreover, sidewall 50 may be of any desired height. As such, safety shield 10 performs the additional function of adding capacity to bin 13. The amount of that additional capacity, of course, is dependent on the height of sidewall 50, that is, the extent to which sidewall 50 extends above bin sidewall 30 when positioned in bin 13 as shown in FIG. 4.

Safety shield 10 includes a central disk-shaped hub 51 having a plurality of arms 52 extending radially outward therefrom. Arms 52 are attached to sidewall 50 near the bottom thereof, thereby forming openings 53 between adjacent arms 52. Openings 53 are thus in the form of sector of an annulus. Hub 51 is preferably dome-shaped and, as best seen in FIG. 4, shield 10 is positioned vertically spaced from ice shelf 31. As such, when ice is delivered to bin 13, it can pass down the dome-shaped hub 51, through openings 53, onto shelf 31 and through opening 32 to be received by the shaver wheel 35 of the blade assembly.

However, shield 10 denies direct access to the blade assembly through opening 32. The diameter of hub 51 is preferably larger than the diameter of opening 32. Therefore, the user has no direct access to opening 32. While the user may try to position his hand through an opening 53, the distance between the edge of hub 51 and sidewall 50 of shield 10, and the distance between the bottom of the shield 10 and the opening 32 can be designed such that the hand of the user cannot transverse the sinuous path to gain access to the blade assembly.

It should thus be evident that a safety shield constructed as described herein accomplishes the objects of the invention and otherwise substantially improves the art.

What is claimed is:

1. An ice shaving device comprising a bin to receive a supply of ice, a blade assembly near the bottom of said bin, there being an access opening to said blade assembly, said access opening being positioned generally centrally relative to the bottom of said bin, a safety shield adapted to be positioned in said bin so as to deny direct human access to said access opening and yet allow ice to pass through said access opening.

2. The device of claim 1 wherein said shield extends out of said bin to increase the capacity of said bin.

3. The device of claim 1 wherein said shield includes a ring-shaped sidewall received in said bin.

4. The device of claim 3 wherein said sidewall is of a height so as to extend out of said bin and increase the capacity of said bin.

5. The device of claim 3 wherein said shield further includes a generally disk-shaped hub connected to said sidewall, said hub being adapted to be positioned over said access opening.

6. The device of claim 5 wherein said hub is larger in diameter than said access opening.

7. The device of claim 5 wherein said shield has at least one opening between said hub and said sidewall, said hub being domed to direct the ice through said opening.

8. The device of claim 5 wherein said shield further includes a plurality of arms extending between said hub and said sidewall to connect said hub to said sidewall.

9. The device of claim 1 further comprising a shelf in said bin, said shelf having said access opening and directing the ice to said access opening.

10. The device of claim 9 wherein said blade assembly includes a shaver wheel positioned below the access opening and a blade at the periphery of said shaver wheel, said shaver wheel directing the ice to said blade.

11. The device of claim 10 further comprising a chute near the bottom of said bin near said blade so that shaved ice may be discharged through said chute.

* * * * *